United States Patent [19]
Oprescu et al.

[11] Patent Number: 5,579,486
[45] Date of Patent: Nov. 26, 1996

[54] COMMUNICATION NODE WITH A FIRST BUS CONFIGURATION FOR ARBITRATION AND A SECOND BUS CONFIGURATION FOR DATA TRANSFER

[75] Inventors: Florin Oprescu, Sunnyvale; Roger W. Van Brunt, San Francisco, both of Calif.

[73] Assignee: Apple Computer, Inc., Cupertino, Calif.

[21] Appl. No.: 4,431

[22] Filed: Jan. 14, 1993

[51] Int. Cl.⁶ .................................................. G06F 3/00
[52] U.S. Cl. ................................ 395/200.15; 395/200.13; 395/831; 370/63; 364/DIG. 1; 364/238; 364/239; 364/240
[58] Field of Search ...................... 395/325, 800, 395/200, 275, 200.15, 200.13, 200.02, 831, 287, 299; 340/825.5, 825.03, 825.02; 370/85.1, 85.3, 63, 87.13

[56] References Cited

U.S. PATENT DOCUMENTS

| | | | |
|---|---|---|---|
| 4,349,870 | 9/1982 | Shaw et al. | 395/800 |
| 4,707,827 | 11/1987 | Bione et al. | 370/85 |
| 4,719,458 | 1/1988 | Miesterfeld | 340/825.5 |
| 4,897,784 | 1/1990 | Nay | 395/325 |
| 4,897,841 | 1/1990 | Gang, Jr. | 370/85.13 |
| 4,985,892 | 1/1991 | Camarata | 370/123 |
| 5,073,982 | 12/1991 | Viola et al. | 359/120 |
| 5,119,398 | 6/1992 | Webber | 375/7 |
| 5,200,743 | 4/1993 | St. Martin et al. | 340/825 |
| 5,249,183 | 9/1993 | Wong et al. | 370/85 |
| 5,311,114 | 5/1994 | Sambamurthy et al. | 370/31 |
| 5,339,307 | 8/1994 | Curtis | 370/13.1 |

FOREIGN PATENT DOCUMENTS

| | | |
|---|---|---|
| 0125773 | 11/1984 | European Pat. Off. . |
| 3710813 | 11/1987 | Germany . |
| 8201095 | 4/1982 | WIPO . |

OTHER PUBLICATIONS

Teener, "A Bus on a Diet–The Serial Bus Alternative", IEEE 1992.
James "Scalable I/O Architecture for Buses" IEEE 1989.
Starr, Robert R., "The Hewlett–Packard Human Interface Link", *Hewlett-Packard Journal*, Jun. 1987, pp. 8–12.
P1394 Working Group of the Microprocessor and Microcomputer Standards Committee, "High Performance Serial Bus", *The Institute of Electrical and Electronic Engineers, Inc.*, Draft 4.2, Nov. 6, 1991.
P1394 Working Group of the Microprocessor and Microcomputer Standards Committee, "High Performance Serial Bus", *The Institute of Electrical and Electronic Engineers, Inc.*, Draft 4.3v1, Feb. 6, 1992. pp. 1–39, pp. i–vii.

(List continued on next page.)

*Primary Examiner*—Larry D. Donaghue
*Attorney, Agent, or Firm*—Blakely, Sokoloff, Taylor & Zafman

[57] ABSTRACT

A node for a communication system that has a plurality of nodes, each of which may be coupled to a local host. The nodes are coupled between themselves in a tree topology by a plurality of point-to-point links. The interconnected nodes provide a first bus configuration for arbitration like a single bus. Following arbitration, the interconnected nodes provide a second configuration for high speed unidirectional data transfer without the bandwidth limitations of a single bus. Each node includes an arbiter, a data bus, a plurality of ports, a first multiplexer to select either the arbiter or the data bus, and a second multiplexer to select either the arbiter or the data bus. The data bus includes a transmit bus and a receive bus that are coupled with a repeater circuit that can resynchronize the data. During arbitration, the multiplexers select the arbiter to provide the function of a single bus for all the nodes. During data transfer, the multiplexers are configured for transmission of data. Furthermore, a node can function as a repeater and resynchronizer even if it is not connected to a local host or if the local host is turned off or otherwise nonoperational.

20 Claims, 5 Drawing Sheets

OTHER PUBLICATIONS

P1394 Working Group of the Microprocessor and Microcomputer Standards Committee, "High Performance Serial Bus", *The Institute of Electrical and Electronic Engineers, Inc.*, Draft 5.0v1, Mar. 8, 1992.

P1394 Working Group of the Microprocessor and Microcomputer Standards Committee, "High Performance Serial Bus", *The Institute of Electrical and Electronic Engineers, Inc.*, Draft 5.3v1, Oct. 14, 1992.

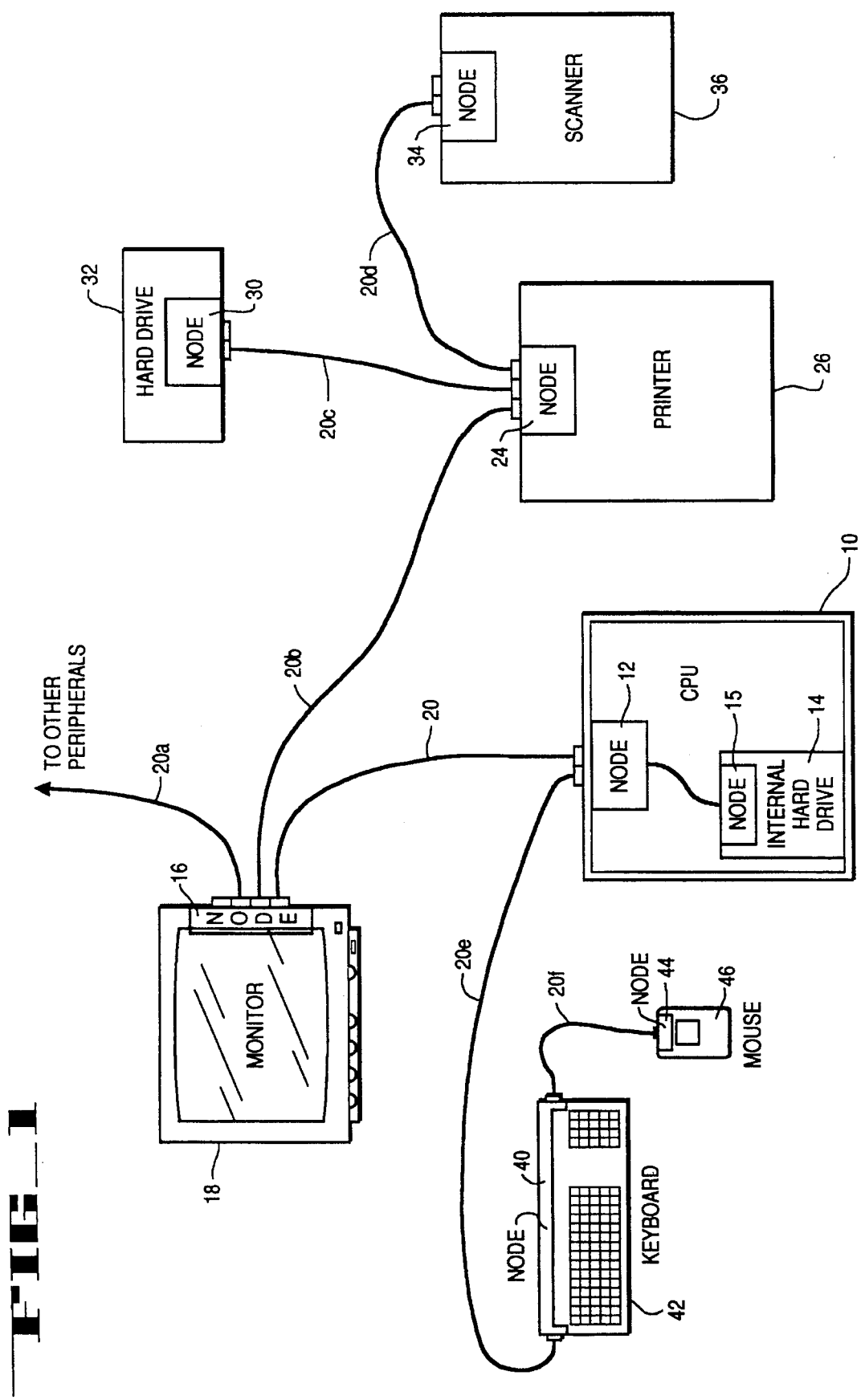

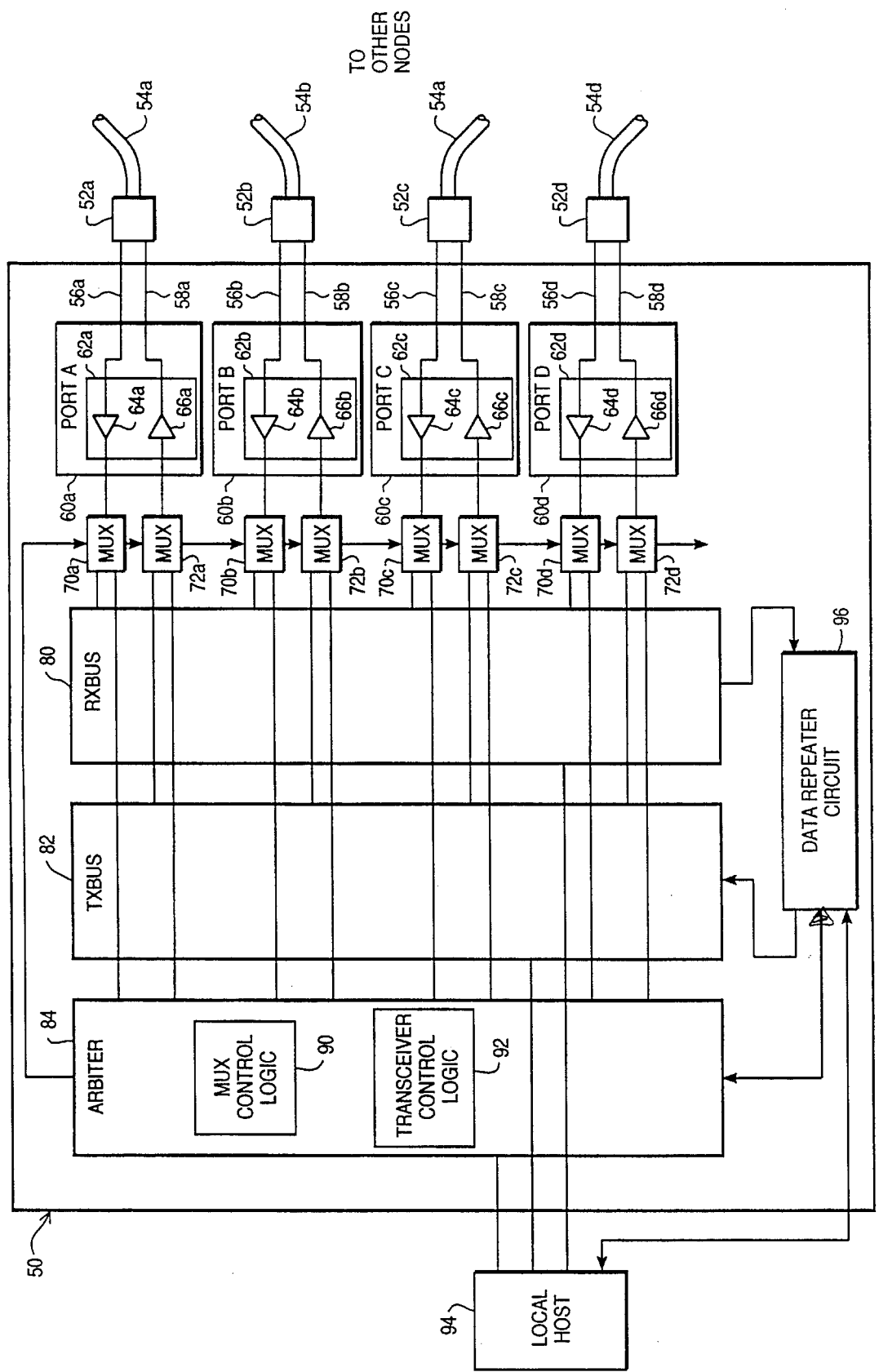

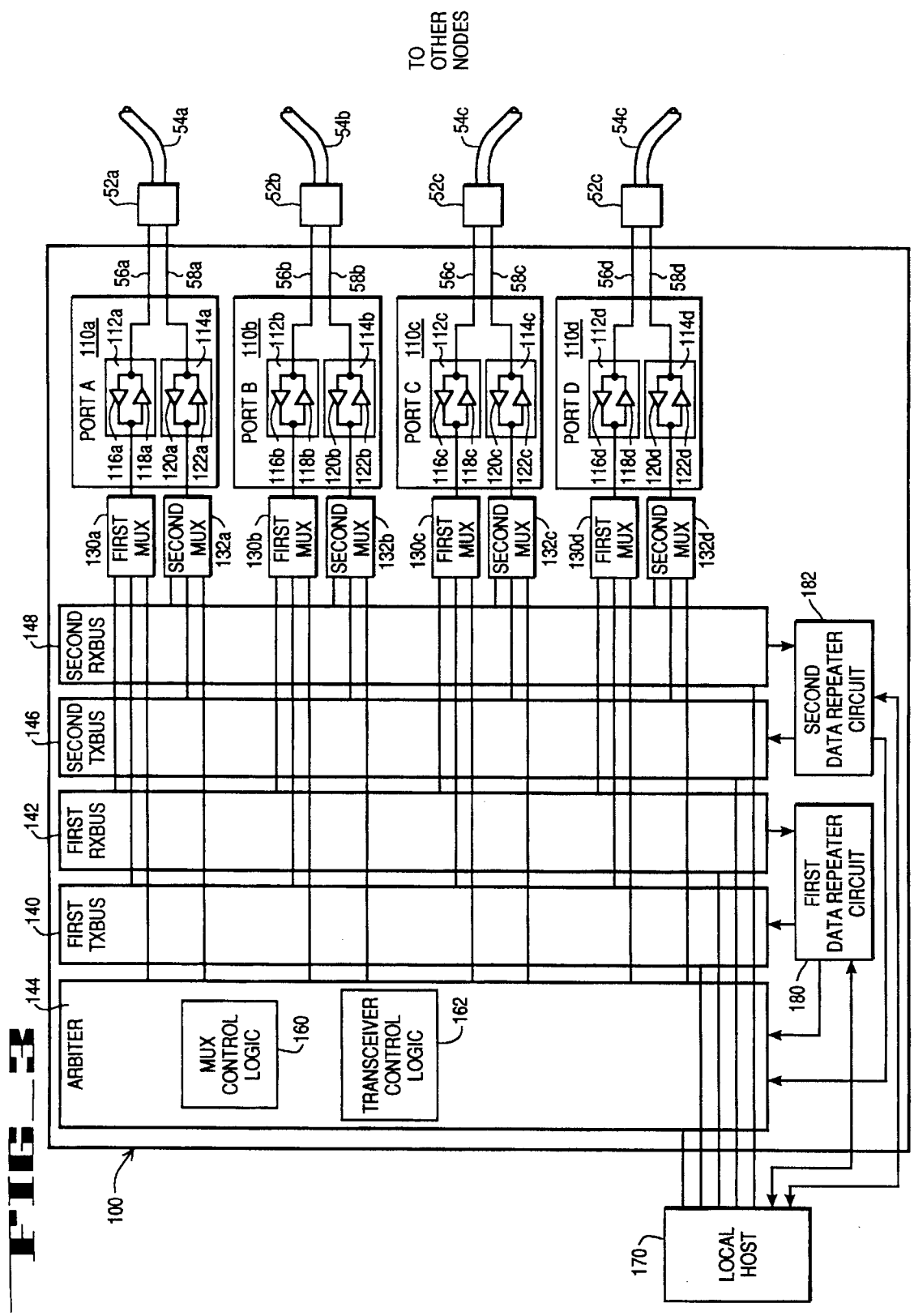

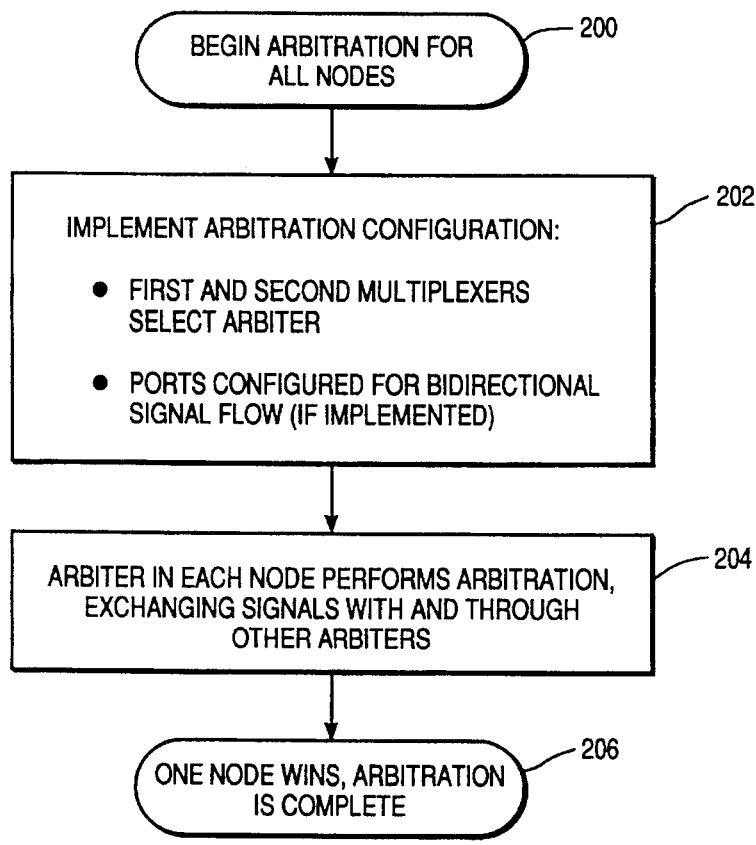
FIG_4
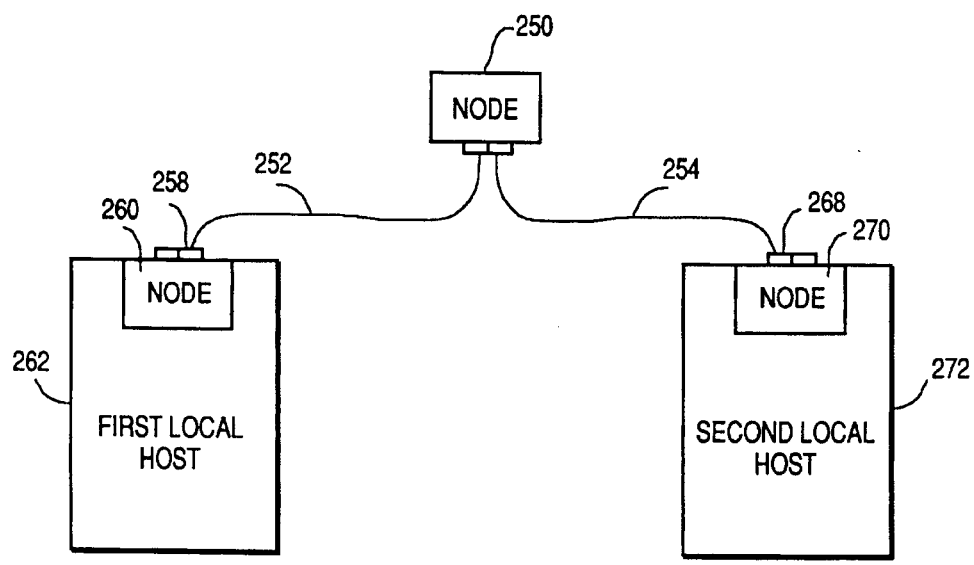
FIG_6

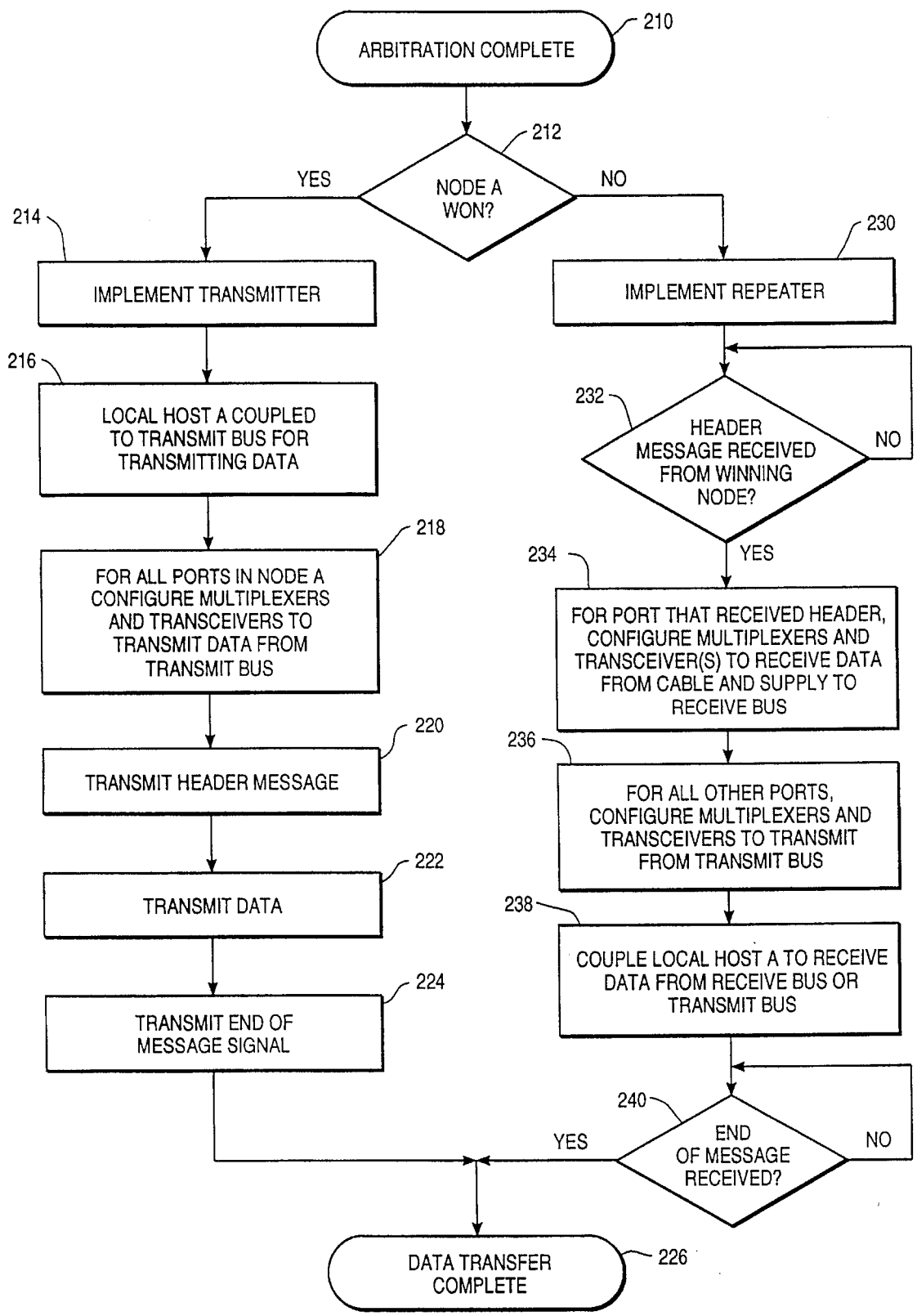

COMMUNICATION NODE WITH A FIRST BUS CONFIGURATION FOR ARBITRATION AND A SECOND BUS CONFIGURATION FOR DATA TRANSFER

This application is related to applications 07/994,402, entitled "Method and Apparatus for Unique Address Assignment, Node Self-Identification and Topology Mapping for a Directed Acyclic Graph", filed Dec. 21, 1992, 07/994,953, now U.S. Pat. No. 5,394,556, entitled "Method and Apparatus for Arbitrating on an Acyclic Directed Graph", filed Dec. 21, 1992, now abandoned, and 07/994,117, entitled "Method and Apparatus for Arbitrating on an Acyclic Topology Collection of Nodes into an Acyclic Directed Graph", filed Dec. 21, 1992, pending, each of which is assigned to the assignee of the present invention.

BACKGROUND OF THE INVENTION

1. Field of the Invention

The present invention relates to communication systems having nodes that arbitrate for control of the bus and that transfer data on the bus. More specifically, the present invention relates to a node that has a first bus configuration for bidirectional arbitration and a second bus configuration for unidirectional data transmission.

2. Description of Related Art

Every communication system having a number of devices (nodes) that compete for a limited resource (a communication bus) must first arbitrate to determine which node will next use the bus. After one node wins, then the communication system must allow the winning node to use the bus without interference from the other nodes. Thus, a bus architecture for a communication system must be designed to facilitate both arbitration and data transfer.

One common bus architecture includes a single physical bus, for example a cable, that is directly connected to each node. Any node coupled to the single bus can transmit a signal which is received by other nodes; i.e. the single bus is designed for communication between any of the nodes. Inter-node communication is particularly useful because any node must be able to place a signal on the bus during arbitration and all other nodes must receive that signal. Arbitration methods to determine which node will next use the single bus are well known, and may include any method such as collision detection, collision avoidance, and token passing.

After arbitration is complete, the data transfer phase begins in which only one node will have control of the bus. All others are either receiving or not listening. Because only one node is transmitting during the data transfer phase it is not necessary that the bus be bidirectional. In the single bus example, transmitted data propagates unidirectionally from the winning node to each of the receiving nodes.

A single bus has a number of disadvantages which become very apparent at higher rates of communication, particularly during the data transfer phase. In general, length and construction can adversely affect the bandwidth of a bus, thereby limiting the maximum speed at which data can be transferred.

One particular problem with a single bus is the number of taps made into the cable to connect the devices. Each tap introduces an impedance discontinuity, causing reflections and losses which adversely affect electrical performance. The more taps, the more performance is degraded. Impedance discontinuities can be avoided by the use of splitters; however splitters are expensive, and they cause one-half of the power to be diverted in each of two directions. Therefore even a few splitters will greatly reduce power and substantially degrade performance.

If a single bus is implemented in a silicon chip, interconnection technologies currently available can greatly reduce the problem with impedance discontinuities. However, for devices that may be distributed over many meters, a single silicon bus is simply not feasible. In summary, operational speed during arbitration and data transfer using a single physical bus is limited by the construction of the bus.

It would be an advantage to provide a communication system with nodes having a plurality of ports that can be connected by point-to-point links, thereby providing a significant speed advantage compared with traditional multi-access buses. It would be an advantage if the nodes have a bus architecture that provides a first bus configuration for arbitration in which the bus can be treated as a single logical bus, and a second bus configuration for high speed unidirectional data transfer without the bandwidth limitations of a single bus. It would be a further advantage if such a system could be implemented with a plurality of nodes connected in a tree configuration, each node having a short silicon bus for high speed data transfer, and if the data could be resynchronized and retimed in each node during data transfer for higher bandwidth, thus transferring data at high rates.

SUMMARY OF THE INVENTION

The present invention provides a node for a communication system that has a plurality of nodes coupled in a tree topology. Each of the nodes may be coupled to a local host. The nodes are coupled between themselves by a plurality of point-to-point links, for example connector cables, printed circuit traces (in a backplane environment), optical links, or other communication media having at a minimum half duplex bidirectional data transfer capabilities. The nodes, when connected, provide the bus configuration of a single bus for arbitration, but allow a second configuration for high speed unidirectional data transfer without the bandwidth limitations of a single bus.

These advantages are provided by a node including an arbiter, a data bus, a port, and a first multiplexer to select either the arbiter or the data bus, and a second multiplexer to select either the arbiter or the data bus. The data bus includes a transmit bus and a receive bus that are coupled with a repeater circuit. The data may be resynchronized by a retiming circuit within the repeater circuit.

During arbitration, the multiplexers select the arbiter to provide the function of a single bus for all the nodes. During data transfer, the multiplexers are configured for transmission. If the local host to which the node is connected wins the arbitration, then the node will be configured to transmit data from all its ports so that the local host can transmit its data. If, however, the local host connected to the node did not win the arbitration, then it will be configured as a repeater. The node that did win the arbitration will supply a signal to one of the ports, and that port will be configured to receive a signal, and all remaining ports will be configured to transmit that signal. The multiplexers and transceivers are controlled to provide the above functions.

A node can function as a repeater and resynchronizer even if it is not connected to a local host or if the local host is turned off or otherwise nonoperational. This feature is useful for communication between devices without interruption in the instance when a signal path passes through a node whose local host is shut off. This feature is also useful for providing a link between devices that are positioned farther apart than the maximum cable length. For example, two devices may be connected by two cables and a node positioned therebetween, which effectively extends the length of the bus without substantial signal degradation. The IEEE 1394 standard requires that power be available from the cable, therefore providing power to operate a node in the absence of a local host or another external power source.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

BRIEF DESCRIPTION OF THE DRAWINGS

FIG. 1 is an illustration of a computer environment in which the communication system of the present invention is useful.

FIG. 2 is a diagram of a serial node in which each port has one two-way transceiver.

FIG. 3 is a diagram of a node in which each port has two two-way transceivers for two-way parallel data transfer and arbitration.

FIG. 4 is a flow chart of an arbitration operation, including configuring the node for arbitration.

FIG. 5 is a flow chart of a data transfer operation, including configuring the node for data transfer.

FIG. 6 is a block diagram of a repeater node coupled between two nodes.

DETAILED DESCRIPTION OF THE PREFERRED EMBODIMENT

FIGS. 1 through 5 of the drawings disclose various embodiments of the present invention for purposes of illustration only. One skilled in the art will readily recognize from the following discussion that alternative embodiments of the structures and methods illustrated herein may be employed without departing from the principles of the invention.

Reference is made to FIG. 1 which illustrates a computer environment in which nodes according to the present invention are useful for performing communication functions such as arbitration and data transfer. It will be apparent that the environment illustrated therein is only one of many possible uses for the nodes, and that many other communication systems can utilize them. The computer environment of FIG. 1 illustrates a CPU unit 10 including a node 12. The CPU node 12 is connected to an internal hard drive 14 which has its own node 15, and can be treated like an external peripheral. A cable 20 connects the CPU node 12 with a node 16 in a monitor 18. The cable 20 is preferably constructed in accordance with IEEE 1394 standard, including a first differential signal pair for conducting a first signal, a second differential signal pair for conducting a second signal, and a pair of power lines. A cable 20a connects the monitor node 16 with other peripherals, and a cable 20b connects the monitor node 16 with another node 24 in a printer 26. From the printer node 24, a cable 20c connects with a node 30 in a hard drive 32. Also from the printer node 24, a cable 20d connects with a node 34 in a scanner 36.

Returning to the CPU 10, the CPU port 12 is connected to a node 40 and the keyboard 42, and the keyboard node 40 is also connected to a node 44 in the mouse 46. In general, each node is connected to its respective device, which defines the "local host" for that node. For example in FIG. 1, the CPU 10 is the local host for the CPU node 12, the monitor 18 is the local host for the monitor node 16, and so forth. However, as discussed later with reference to FIG. 6, it is not necessary for every node to have a local host, nor is it necessary that the local host always be powered. The organization and operation of the nodes are described herein, particularly with reference to FIGS. 2–5.

Each of the above nodes 12, 18, 24, 30, 34, 40, and 44 may have identical construction, although some of the nodes, such as the mouse node 44, can be simplified because of their specific functions. Thus, the nodes can be modified to meet the needs of the particular local host. For example, each node has one or more ports, the number of which is dependent upon its needs. For example, the CPU port 12 as illustrated has three ports, while the mouse node 44 has only one port.

Reference is made to FIG. 2 which is a block diagram of a serial node 50. Preferably, the node 50 is formed on a single silicon chip. A plurality of sockets 52a–d are provided to connect connector cables 54a–d with external nodes such as those shown in FIG. 1. For purposes of description when repeated parts are discussed, a single reference numeral may used to refer to each of those parts if a particular one is not being referenced. For example, "52" may be used in some instances to reference any of the parts indicated by the reference numerals "52a–d".

Preferably, the sockets 52 and cables 54 are constructed in accordance with the IEEE 1394 standard, and therefore include two pairs of differential signal lines and one pair of power lines. Each differential pair of signal lines supplies a separate signal. Specifically, the first differential pair is connected to provide a first signal on a first signal line 56 and the second differential pair is connected to provide a second signal on a second signal line 58 to a port 60. However, in other embodiments (not shown) there may be only one signal input, and transceiver control logic to be described with a reference numeral 92 could be used to control whether the single line is being used for transmitting or receiving.

The sockets 52 and the cables 54 form point-to-point communication links with other nodes. In a point-to-point communication link, the only connections are those at the two ends. There are no taps or other impedance discontinuities to corrupt electrical performance, and as a result, a point-to-point link has a significant speed advantage over traditional multi-access buses. Other point-to-point links that could be utilized include optical links, coaxial cables, and microstrips. In general, any communication link that can provide at a minimum half duplex bidirectional data transfer will be an adequate point-to-point link. Of course, a full duplex data transfer link will provide increased performance over a half duplex system.

As illustrated, there are four ports 60, labeled "60a, 60b, 60c, 60d". In other embodiments there may be as little as one port, or two, three, four ports 60, together with the associated circuitry to be discussed. Each port 60 includes a transceiver 62 that includes a conventional receiver 64 and a conventional transmitter 66. Of course, the receiver 64 is coupled through the cable 54 to a transmitter on a remote port (not shown) and the transmitter 66 is couple to a receiver on the remote port. In the illustrated embodiment, the receiver 64 couples the first signal line 56 with a first multiplexer 70 and the transmitter 66 couples the second signal line 58 with a second multiplexer 72.

The first multiplexer 70 couples the first signal to one of a receive bus (RXBUS) 80 and an arbiter 84. The second multiplexer 72 couples the second signal to one of a transmit bus (TXBUS) 82 and the arbiter 84. The receive bus 80 and the transmit bus 82 are preferably constructed of silicon.

The serial node 50 has a different configuration for the two phases: a first configuration for the arbitration phase and a second configuration for the data transfer phase. In the first configuration for the arbitration phase, the arbiter 84 includes control logic that makes the node 50 appear like a part of a single logical bus to all other nodes. In other words, any signals received by the arbiter 84 are passed onto all other nodes. Furthermore, the arbiter 84 can independently place signals on the bus by transmitting them to all other nodes. The other nodes all have the same properties, therefore collectively all nodes look like one bus during arbitration. To implement the second configuration for the data transfer phase, the arbiter 84 includes control logic responsive to signals received through the serial ports 60 during arbitration to determine which one port 60 will be used to receive data during the data transfer phase. Preferably, the arbiter 84 is constructed in accordance with principles described in the following U.S. patent applications which are also referenced at the beginning of this application, and are incorporated by reference herein: Ser. No. 07/994,402, entitled "Method and Apparatus for Unique Address Assignment, Node Self-Identification and Topology Mapping for a Directed Acyclic Graph", filed Dec. 21, 1992, now U.S. Pat. No. 5,394,556, Ser. No. 07/994,983, entitled "Method and Apparatus for Arbitrating on an Acyclic Directed Graph", filed Dec. 21, 1992, now abandoned, and Ser. No. 07/994, 117, entitled "Method and Apparatus for Arbitrating on an Acyclic Topology Collection of Nodes into an Acyclic Directed Graph", pending, filed Dec. 21, 1992, each of which is assigned to the assignee of the present invention. In alternate embodiments, the arbiter 84 may comprise a single bus that has a dominant logic. In that embodiment, the arbiter 84 would include conventional control circuitry to perform arbitration on that single dominant logic bus.

Additionally, the arbiter 84 includes multiplexer control logic 90 to control the first multiplexer 70 and the second multiplexer 72, and transceiver control logic 92 to control the transceiver 62 in each port 60. Thus, the multiplexer control logic 90 controls the coupling between each port 60 and the arbiter 84, the receive bus 80, and the transmit bus 82. The transceiver control logic 92 can be utilized to control the direction of the signal flow, for example by turning the transmitters 66 on or off. For example, during data transfer the receivers of the transmitting ports could be disabled, or the transmitters of the receiving ports could be disabled. If one or the other were not turned off, then positive feedback could result in a latch-up, in which the receiver and transmitter forever pass the same value between themselves and the other nodes.

During the arbitration phase, the arbiter 84 selects itself in the first multiplexer 70 and the second multiplexer 72, so that the arbiter 84 can bidirectionally receive and transmit signals through the ports 60. During the data transfer phase, at most one of the ports 60 will receive data, and all other ports 60 will transmit data.

A local host 94, which can be any of the devices illustrated in FIG. 1, is coupled to the receive bus 80, the transmit bus 82, and the arbiter 84. In a most general application, the local host 94 could be coupled to the buses 80,82 and the arbiter 84 like any other external node. However, that arrangement is unnecessary for most hosts, because they will likely already include interface circuitry, or can be easily designed with circuitry or software to interface directly with the arbiter 84, the receive bus 80, and the transmit bus 82.

The local host 94 may provide a signal to the arbiter 84 to indicate whether or not the local host 94 requests use of the bus. In this context, "bus" refers to the collection of interconnected nodes. If the local host 94 does request use of the bus, then the arbiter 84 will supply signals through the transmitters 66 in each port 60 to the other nodes to attempt to gain control of the bus. If the local host 94 wins the arbitration, then the arbiter 84 will send out the signals to the other external ports to indicate that it has won the arbitration. Subsequently, it will transfer control of the transmit bus 82 to the local host, and controls the second multiplexers 72 for each port 60 to select the transmit bus 82.

If the local host 94 does not win the arbitration, it will receive a signal from the external node that won the arbitration through one of the ports 60. In this instance, the node 50 will function as a repeater, repeating the signal received from the one port 60 that won the arbitration and supplying it to the other external nodes to which it is connected. In the preferred embodiment, the node that won the arbitration supplies or transmits a header which is received in port 60a, for example, and supplied to the arbiter 84. Then, the arbiter 84 recognizes that the node connected to port 60a has won the arbitration, and selects the first multiplexer 70a to connect port 60a to the receive bus 80. Next, the arbiter 84 sends out header information from the arbiter 84 through each of the other ports 60b, 60c, 60d, and if these ports 60 are connected to other ports within nodes that are capable of receiving data at the rate indicated, then the arbiter 84 will couple those ports to the transmit bus 82 using the appropriate second multiplexers 72.

The data received from the winning node through the port 60a is propagated from the receive bus 80 through a data repeater circuit 96, which may include any conventional data repeater circuit such as an amplifier. The repeater circuit 96 may provide any of a number of other operations on the data. In addition to amplifying the data to a predetermined level, it may retime the data, or it may resynchronize the data so that it has the shape of the originally transmitted data. The resynchronization function is particularly useful for high speed communication. Data received from a communication link may be somewhat corrupted, or at the minimum it likely will not look the same as when it was originally transmitted. The resynchronization function operates by first receiving a digital data signal, for example a "1" that is received, for example, with a length of 10 ns, although it may have been originally transmitted at 15 ns. The resynchronization function takes this 10 ns signal and retimes it so that it is 15 ns, like the originally transmitted signal. Furthermore, the amplitude of the signal can also be adjusted in accordance with what was originally transmitted. Of course, the resynchronization function requires predetermined knowledge of the length of the signal. This predetermined knowledge may be determined by protocol or some other high level function. Thus, a signal which has been degraded or otherwise corrupted during transmission is reconstituted to its original form, which advantageously increases the bandwidth of data transfer between interconnected nodes.

The repeated data from the repeater circuit 96 is supplied to the transmit bus 82 which distributes it to the ports 60 that are connected thereto. The repeater circuit 96 may also include circuits for detecting signals, such as end of message signals that may be sent during data transfer. This information could be provided to the local host 94 or the arbiter 84 to facilitate effective control of communication operations.

The configuration in which a data bus structure 98 for data transfers includes a receive bus 80, a transmit bus 82, and a repeater circuit 96 is advantageous for increasing the bandwidth of the signal passing therethrough. However, in other embodiments, the bus structure 98 could be simplified by using a single bus for receiving and transmitting. In that alternative embodiment, both the first and second multiplexers would be coupled to the single data transfer bus as well as the arbiter 84. Such a bus structure would not have the repeater circuit 96 and therefore may have lower bandwidth, however it would be simplified and it would likely be less expensive to implement.

Reference is made to FIG. 3 which is a diagram of a parallel node 100 that allows bidirectional, parallel transmission and reception of signals using connectors constructed in accordance with the IEEE 1394 standard. As in FIG. 2, a plurality of sockets 52a–d connect to external nodes. Each socket 52 is constructed in accordance with the IEEE 1394 standard, and therefore has two pairs of differential signal lines and one pair of power lines and supplies a first signal on the first signal line 56 and a second signal on a second signal line 58, which are supplied to a parallel port 110. Each port 110 in the parallel node 100 includes a first two-way transceiver 112 coupled to the first signal line 56 and a second two-way transceiver 114 coupled to the second signal line 58. The first two-way transceiver 112 includes a first receiver 116 and a first transmitter 118. The second two-way transceiver 114 includes a second receiver 120 and a second transmitter 122. The first transceiver 112 is connected to a first multiplexer 130, and the second transceiver 114 is coupled to a second multiplexer 132.

The first multiplexer 130 is coupled to select one of a first transmit bus (TXBUS) 140, a first receive bus (RXBUS) 142, and an arbiter 144. The second multiplexer 132 is coupled to select one of a second transmit bus (TXBUS) 146, a second receive bus (RXBUS) 148, and the arbiter 144. Thus, two sets of transmit and receive buses are provided for parallel data transfer. Specifically, a first set includes the first transmit bus 140 and the first receive bus 142, and the second set includes the second transmit bus 146 and the second receive bus 148. The first multiplexer 130 couples the first transceiver 112 with either the arbiter 144, the transmit bus 140 from the first set, or the receive bus 142 from the first set. Similarly, the second multiplexer 132 can be selected to couple the second transceiver 114 with either the arbiter 144, the second transmit bus 146, or the second receive bus 148.

The arbiter 144 includes control logic responsive to signals received through the parallel ports 110 during arbitration to determine which one port 110 will be used to receive data during the data transfer phase to follow. Preferably, the arbiter 144 is constructed to perform arbitration in accordance with principles described in the following patent applications which are also referenced at the beginning of this application, and are incorporated by reference herein: Ser. No. 07/994,402, entitled "Method and Apparatus for Unique Address Assignment, Node Self-Identification and Topology Mapping for a Directed Acyclic Graph", filed Dec. 21, 1992, now U.S. Pat. No. 5,394,556, Ser. No. 07/994,983, entitled "Method and Apparatus for Arbitrating on an Acyclic Directed Graph", filed Dec. 21, 1992, now abandoned, and Ser. No. 07/994,117, entitled "Method and Apparatus for Arbitrating on an Acyclic Topology Collection of Nodes into an Acyclic Directed Graph", filed Dec. 21, 1992, pending, each of which is assigned to the assignee of the present invention.

The arbiter 144 also is coupled to the first and second multiplexers 130,132, to control the selection made by each of the multiplexers, using MUX control logic 160 provided therein. Additionally, the arbiter 144 is coupled to each transceiver 112, 114, and includes transceiver control logic 162 to control the direction of data flow through each of the transceivers 112, 114. For example, both the first and second transceivers 112a, 114a in port 110a may be controlled to receive data, or both transceivers 112a, 114a may be controlled to transmit data, or the first transceiver 112a can be controlled to receive data and the second transceiver 114a can be controlled to transmit, in accordance with predetermined protocols.

During arbitration, the parallel node 110 of FIG. 3 can operate identically with the serial node 50 of FIG. 2 by selecting the arbiter 144 in the first and second multiplexers 130, 132, and controlling the first transceiver 112 to receive and the second transceiver 114 to transmit. However, preferably the ports 110 include additional control circuitry for bidirectional message flow through both transceivers 112 and 114.

A local host 170, which can be any of the devices illustrated in FIG. 1, is coupled to the first and second receive buses 142,148, the first and second transmit buses 140,146, and the arbiter 144. In a most general application, the local host 94 could be coupled to the buses 140,142, 146,148 and the arbiter 144 like any other external node. However, that arrangement is unnecessary for most hosts, because they will likely already include circuitry, or can be designed with circuitry to interface directly with the arbiter 144 and the buses 140,142,146,148.

The local host 170 may provide a signal to the arbiter 144 to indicate whether or not the local host 170 requests use of the bus. Depending upon the results of the arbitration, the parallel node 110 will either be configured as a transmitter if the local host 170 won the arbitration, or as a repeater if another local host won. If the local host 170 won, then MUX control logic 160 will select the first transmit bus 140 in the first multiplexer and the second transmit bus 146 in second multiplexer 132, and the transceiver control logic 162 will control the first and second transceivers 112, 114 to transmit. The local host 170 will supply its data to the first and second receive buses 142, 148, and it will be transmitted from each of the parallel ports 110. Thus, during data transfer, the arbiter 144 in the parallel node 100 controls each port 110 to receive or transmit data in parallel. This configuration will continue until the next arbitration phase.

However, if local host 170 did not win, then the parallel node 100 will be configured as a repeater, receiving data in parallel on one of the ports 110, and transmitting it on all others (assuming that the external node is capable of receiving the data). In the repeater configuration, the transceiver control logic 162 in the arbiter 144 controls the first and second transceivers 112, 144 in the receiving port 110, for example port 110a, to receive data. Furthermore, the MUX control logic 160 controls the first and second multiplexers 130, 132 in the receiving port 110a to connect to the first receive bus 142, and the second receive bus 148, respectively. The remaining ports 110 are all transmitting ports, therefore, the transceiver control logic 162 controls the transceivers 112, 114 in the transmitting ports 110 to transmit data, and the MUX control logic 160 selects the transmit buses 140, 146 in the first multiplexer 130 and the second multiplexer 132.

A first repeater circuit 180 couples the first receive bus 142 with the first transmit bus 140. Likewise, a second repeater circuit 182 couples the second receive bus 148 with the second transmit bus 146. The first and second data repeater circuits 180, 182 are similar to the data repeater circuit 96 described with reference to FIG. 2, and may include any conventional data repeater circuit, such as an amplifier, a resynchronizer or a data regenerator. The first and second repeater circuits 180, 182 may also include circuits for detecting signals that may be sent during data transfer, such as end of message signals. This information could be provided to the local host 170 or the arbiter 144 to facilitate effective control of communication operations.

Reference is made to FIG. 4 which illustrates arbitration operations, including implementing the arbitration configuration. Reference is subsequently made to FIG. 5 which is a flow chart that illustrates operations for data transfer following arbitration, including configuring the node for transferring data.

Referring first to FIG. 4, a block 200 illustrates that arbitration begins for all nodes. Next, in a box 202, the arbitration configuration is implemented in each of the nodes. Specifically, to implement the arbitration configuration the first and second multiplexers both select the arbiter, so that the ports are coupled to the arbiter. Then, if implemented, the ports are configured for bidirectional signal flow. In the embodiment of FIG. 2, the transceiver 62 is already configured for bidirectional signal flow, so it is only necessary to ensure that the receiver 64 and transmitter 66 are operational. However, in the embodiment of FIG. 3, the parallel port 110 has two transceivers 112, 114, that are configured for transmission by enabling both the transmitter 118 and the transmitter 122. Next in a box 204 in FIG. 4, the arbiter in each node performs the arbitration operation, during which signals are exchanged with and through other arbiters. The operation of the arbiters has been discussed previously with reference to FIGS. 2 and 3. Next, as illustrated in a box 206, one node wins the arbitration, and arbitration is complete.

Reference is now made to FIG. 5 which illustrates steps for data transfer following completion of the arbitration as illustrated in a block 210. In a decision 212, a determination is made as to whether a particular node won. This step is typically performed within each arbiter. Specifically, each arbiter will know whether or not it won the arbitration and some mechanism will have been set up to determine this. However, at this point it will not know which of the nodes did win the arbitration. In the decision 212, a reference is made to node A which is any arbitrary node in a communication system of connected nodes such as illustrated in FIG. 1. If node A did win, then the transmitter configuration is implemented as illustrated in a box 214. Then, a local host A, which is connected to the node A, is coupled to the transmit bus for transmitting data, as illustrated in the step 216. Next, as illustrated in the step 218, for all ports in node A the multiplexers and transceivers are configured to transmit data from the transmit bus. This configuration has been discussed previously with reference to FIGS. 2 and 3.

Next, in a box 220 a header message may be transmitted to identify the winning node. In other embodiments other methods may be used to identify the node that won. The step 220 is provided to show one way of notifying the other nodes that port A did win the arbitration. Subsequently in a block 222 the data is transmitted from the node A, and upon completion of data transfer, operation moves to a box 224 in which the end of message signal is transmitted. Subsequently as illustrated in a block 226, data transfer is complete.

Returning to the top of FIG. 5, from the decision 212, if node A did not win the arbitration, then operation moves to the block 230 in which node A implements the receiver configuration. Since node A does not actually know who or which node won the arbitration, operation moves to a decision 232 in which the operation waits until a header message is received from the winning node. After the header message is received, operation moves to the box 234 which illustrates that for the port that received the header, the multiplexers and transceivers are configured to receive data from the cable to which that port is connected, and to supply this data to the receive bus. Then, as illustrated in a box 236, all other ports are configured with multiplexers and transceivers to transmit data from the transmit bus. Thus, as described previously, the data can enter through the receiving port and is repeated out through all other ports. Next, as illustrated in a block 238, the local host A is coupled to receive data from either the receive bus, or the transmit bus, as appropriate for the design of the circuit. The node stays in the repeater configuration until, as illustrated in decision 240, an end of message is received. Following reception of the end of message signal, data transfer is complete and operation moves to the box 226.

Even if a local host is not connected to a node, that node can still perform its repeater function if it is supplied with sufficient power to operate. This is particularly useful in a computer environment such as that illustrated in FIG. 1 in which one of the local hosts, such as the printer 26, may be shut down. The IEEE 1394 standard specifies that nodes can be powered directly from the cable, thereby providing power for the repeating function. Therefore, for example, the printer node 24 can repeat data received from the cables 20b and supply it to the hard drive 32 and the scanner 36, even if the printer 26 is not operational.

Reference is made to FIG. 6, which is a block diagram of a repeater node 250 installed between a first cable segment 252 and a second cable segment 254. The repeater node 250 may be identical with the nodes 50 or 100 previously described, except that it is not connected to a local host. Power to operate the repeater node 250 can be provided through either of the cable segments 252, 254, or from some other conventional source. The first cable segment 252 is coupled to a port 258 in a first node 260 that is connected with a first local host 262. The second cable segment 252 is coupled to a port 268 in a second node 270 that is connected with a second local host 272. The local hosts 262, 272 can be any appropriate local host, for example any local host shown in FIG. 1 would be appropriate.

The repeater node 250 is particularly useful for connecting nodes that are positioned farther apart than the maximum single cable length thereby in practical terms extending the maximum length of a cable between two local hosts. For example, the node 260 may be positioned ten meters from a second node 270. If the maximum cable length is six meters and the cable segments 252, 254 have that length, then the first cable segment 252, the repeater node 250, and the second cable segment 254 result in a twelve meter connection. More than one repeater nodes 250 can be utilized, as appropriate, to extend the length of a connecting cable between distant nodes without significant signal degradation as long as the maximum number of nodes in any particular implementation, for example the IEEE 1394 standard, is not exceeded. Furthermore, the IEEE 1394 standard requires that the cables include a power line. Therefore the repeater node 250 can be powered directly from the cables 252 or 254, which would obviate any need for an external power connection.

From the above description, it will be apparent that the invention disclosed herein provides a novel and advantageous mixed bus architecture. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. A communication system for interconnecting a plurality of local hosts, the communication system providing a first bus configuration for arbitration and a second bus configuration for unidirectional data transfer, comprising:

a plurality of nodes, each node including an arbiter, a data bus, at least one port, and at least one multiplexer responsive to said arbiter for selectively coupling each port of the node to one of the arbiter and the data bus;

a plurality of point-to-point links, each point-to-point link coupling a port of a first node with a port of a second, different node, so that the nodes have a tree topology coupled by said point-to-point links;

a plurality of local hosts, each local host being coupled to one of the nodes for arbitrating bus access, receiving data, and transmitting data; and wherein in the first bus configuration the multiplexers couple the arbiters to the ports to receive and transmit arbitration messages thereon, and in the second bus configuration the multiplexers couple the data bus to the ports to selectively receive and transmit data thereon.

2. The communication system of claim 1 wherein at least one of the point-to-point links includes a connector cable having a first signal line for communicating a first signal and a second signal line for communicating a second signal.

3. The communication system of claim 2 wherein the connector cable further comprises a first power line for transferring power between nodes.

4. The communication system of claim 3 wherein each of the ports coupled to the connector cable comprises a transceiver having a transmitter and a receiver, said first signal is coupled to the transmitter, and the second signal is coupled to the receiver.

5. The communication system of claim 4 wherein the at least one multiplexer of each node comprises:

a set of first multiplexers responsive to the arbiter, each of the set of first multiplexers for selectively coupling the receiver in each port of the node to one of the arbiter and the data bus, and a set of second multiplexers responsive to the arbiter, each of the set of second multiplexers for selectively coupling the transmitter in each port of the node to one of the arbiter and the data bus.

6. The communication system as claimed in claim 5, wherein the data bus in at least one node comprises:

a transmit bus coupled to the set of second multiplexers for supplying data to the ports;

a receive bus coupled to the set of first multiplexers for receiving data from the ports; and coupling means for coupling the receive bus to the transmit bus.

7. The communication system as claimed in claim 6, wherein the coupling means includes a repeater circuit.

8. The communication system as claimed in claim 7 wherein the repeater circuit includes means for resynchronizing data.

9. The communication system of claim 2 wherein each of the ports coupled to the connector cable comprises a first transceiver having a transmitter and a receiver and a second transceiver having a transmitter and a receiver, and the first signal is coupled to the first transceiver and the second signal is coupled to the second transceiver.

10. The communication system of claim 9 wherein the arbiter includes transceiver control logic coupled to the first and second transceivers for controlling the direction of signal flow through each of the transceivers.

11. The communication system of claim 9 wherein each node further comprises:

a set of first multiplexers responsive to the arbiter, each of the set of first multiplexers for selectively coupling the first transceiver of each port of the node to one of the arbiter and the data bus, and a set of second multiplexers responsive to the arbiter, each of the set of second multiplexers for selectively coupling the second transceiver in each port of the node to one of the arbiter and the data bus.

12. The communication system as claimed in claim 11, wherein the data bus in at least one node comprises:

a transmit bus coupled to said second multiplexers for supplying data to the ports;

a receive bus coupled to said first multiplexers for receiving data from the ports; and coupling means for coupling the receive bus to the transmit bus.

13. The communication system as claimed in claim 11, wherein the coupling means includes a repeater circuit.

14. The communication system as claimed in claim 13 wherein the repeater circuit includes means for resynchronizing data.

15. A communication node for performing arbitration and data transmission between a plurality of like nodes, each node being coupled to at least one other node by a point-to-point communication link, the communication node providing a first bus configuration in which the bus appears as a single logical bus for arbitration and a second bus configuration in which the bus is configured for unidirectional data transmission, the communication node comprising:

a plurality of communication ports, each port coupled to one of the point-to-point communication links, each port having a transceiver including a receiver and a transmitter;

an arbiter coupled to each of the communication ports;

a data bus coupled to each of the communication ports; and a plurality of first multiplexers, each first multiplexer being coupled to one of the receivers, each first multiplexer being selectable by the arbiter to couple the receiver to one of the data bus and the arbiter;

a plurality of second multiplexers, each second multiplexer being coupled to one of the transmitters, each second multiplexer being selectable by the arbiter to couple the transmitter to one of the data bus and the arbiter, wherein in the first bus configuration the arbiter is coupled to the communication ports to receive and transmit arbitration messages thereon, and in the second bus configuration the ports are coupled to the data bus to selectively receive and transmit data thereon.

16. The communication node as claimed in claim 15, wherein the data bus comprises:

a transmit bus coupled to the local host and the second multiplexers for supplying data to the ports;

a receive bus coupled to the local host and said first multiplexers for receiving data from the port; and coupling means for coupling the receive bus to the transmit bus.

17. The communication node as claimed in claim 16, wherein the coupling means includes a repeater circuit.

18. The communication node as claimed in claim 17 wherein the repeater circuit includes means for resynchronizing data.

19. A communication node for performing arbitration and data transmission between a plurality of like nodes, each node being coupled to a local host and coupled to at least one other node by a point-to-point communication link having a first signal line for communicating a first signal and a second signal line for communicating a second signal, the communication node providing a first bus configuration in which the bus appears as a single logical bus for arbitration and a second bus configuration in which the bus is configured for unidirectional data transmission, said communication node comprising:

a plurality of communication ports, each port coupled to the first signal line and the second signal line, each port having a transceiver including a receiver coupled to the first signal line and a transmitter coupled to the second signal line;

an arbiter coupled to the local host and each of the communication ports to control the direction of signal flow through the ports;

a transmit bus coupled to the local host and the ports for supplying data to the ports;

a receive bus coupled to the local host and the ports for receiving data from the ports;

a data repeater circuit coupled between the transmit bus and the receive bus;

a plurality of first multiplexers, each first multiplexer being coupled to one of the receivers, each first multiplexer being selectable by the arbiter to couple the receiver to one of the receive bus and the arbiter;

a plurality of second multiplexers, each second multiplexer being coupled to one of the transmitters, each second multiplexer being selectable by the arbiter to couple the transmitter to one of the transmit bus, the receive bus, and the arbiter; and wherein in the first bus configuration the arbiter is coupled to said first and second multiplexers to receive and transmit arbitration messages thereon, and in the second bus configuration the first multiplexer is coupled to the receive bus to receive data, and the second multiplexer is coupled to the transmit bus to transmit data thereon.

20. A communication node for performing arbitration and parallel data transmission between a plurality of like nodes, each node being coupled to a local host and also coupled to at least one other node by a point-to-point communication link having a first signal line for communicating a first signal and a second signal line for communicating a second signal, the communication node providing a first bus configuration in which the bus appears as a single logical bus for arbitration and a second bus configuration in which the bus is configured for unidirectional, parallel data transmission, the communication node comprising:

a plurality of communication ports, each port coupled to the first signal line and the second signal line, each port having a first transceiver coupled to the first signal line, the first transceiver including a first receiver and a first transmitter, each port also having a second transceiver coupled to the second signal line, the second transceiver including a second receiver and a second transmitter;

an arbiter coupled to the local host, the arbiter including arbitration control logic responsive to signals on the first and second signal lines on each port of the node;

a first transmit bus coupled to the local host;

a second transmit bus coupled to the local host;

a first receive bus coupled to the local host;

a second receive bus coupled to the local host;

a first data repeater circuit coupled between the first transmit bus and the first receive bus;

a second data repeater circuit coupled between the second transmit bus and the second receive bus;

a plurality of first multiplexers, each of said first multiplexers being coupled to one of the first transceivers in the node, each first multiplexer being selectable to couple the first transceiver to one of the first receive bus, the first transmit bus, and the arbiter;

a plurality of second multiplexers, each of the second multiplexers being coupled to one of said second transceivers in the node, each second multiplexer being selectable to couple said second transceiver to one of the second receive bus, the second transmit bus, and the arbiter; and wherein the arbiter is coupled to said first and second multiplexers, and further includes multiplexer control logic to select the coupling by the multiplexer, and further, wherein the arbiter is coupled to said first and second transceivers, and includes transceiver control logic to select the direction of signal flow through each of the transceivers.

* * * * *